May 25, 1948.  T. T. SHORT  2,442,214
VOLTAGE STABILIZER
Filed July 14, 1944  2 Sheets-Sheet 1
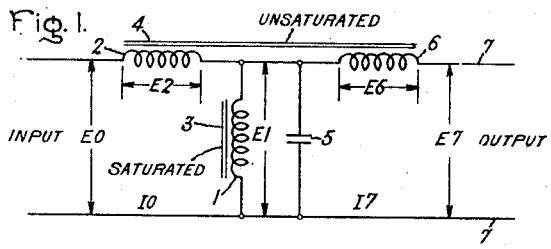
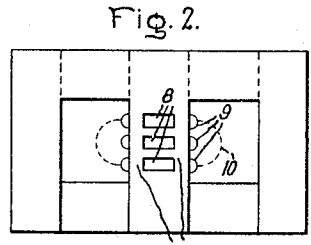
SATURATED RESTRICTED SECTIONS
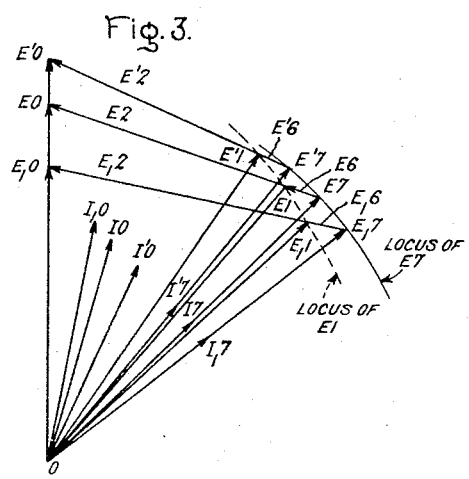
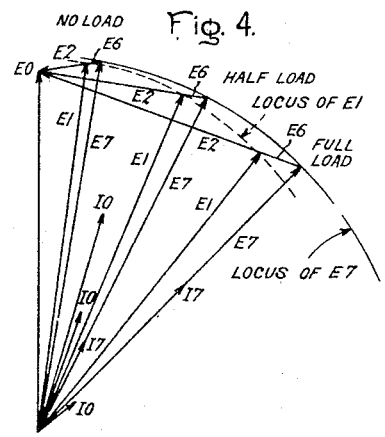
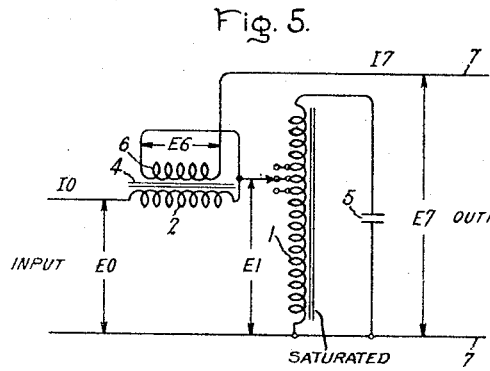
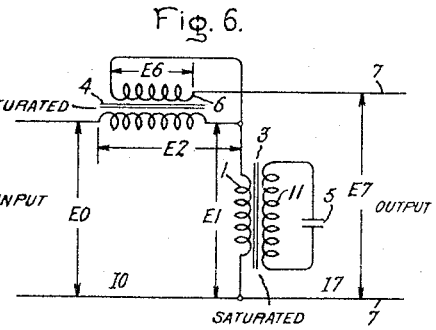
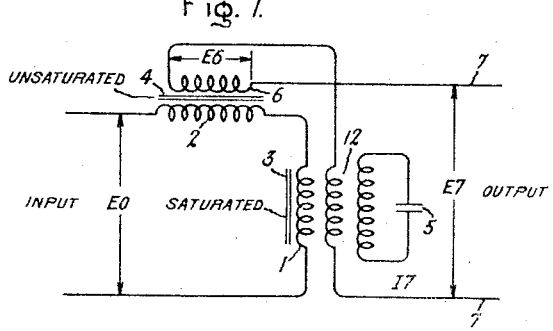
Inventor:
Thomas T. Short,
by Harry E. Dunlap
His Attorney.

May 25, 1948. T. T. SHORT 2,442,214
VOLTAGE STABILIZER
Filed July 14, 1944 2 Sheets-Sheet 2
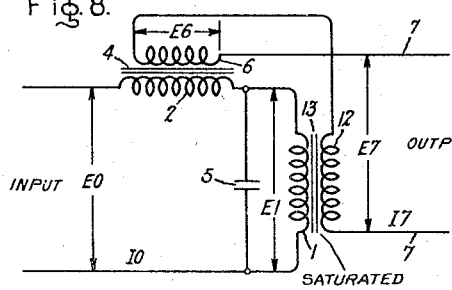
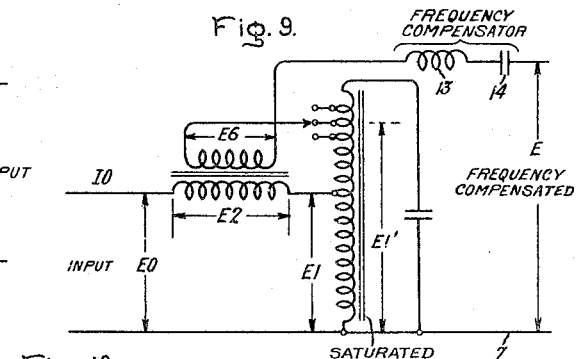
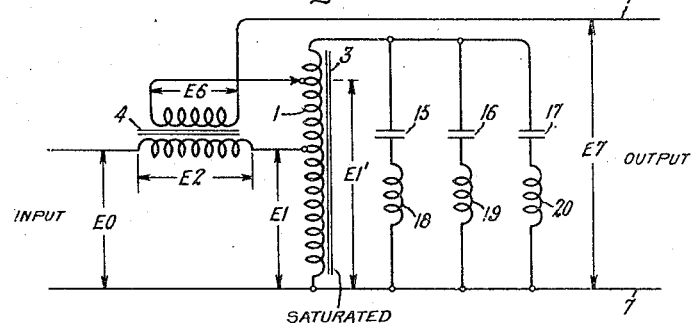
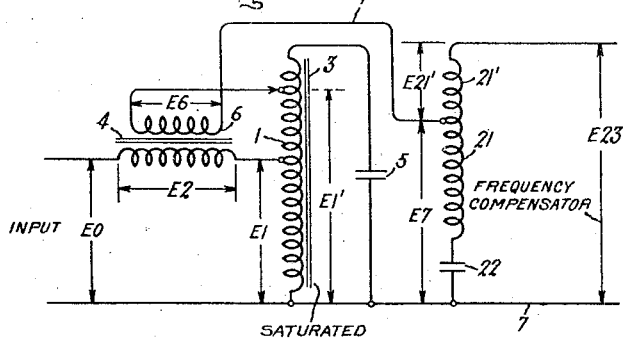
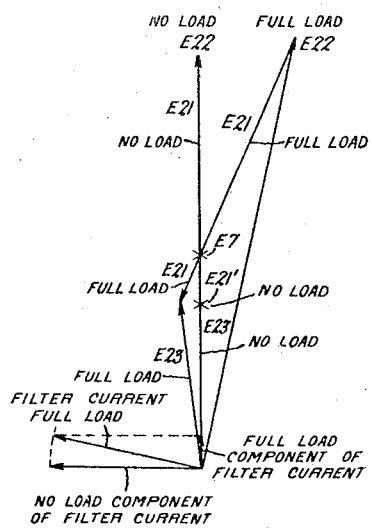
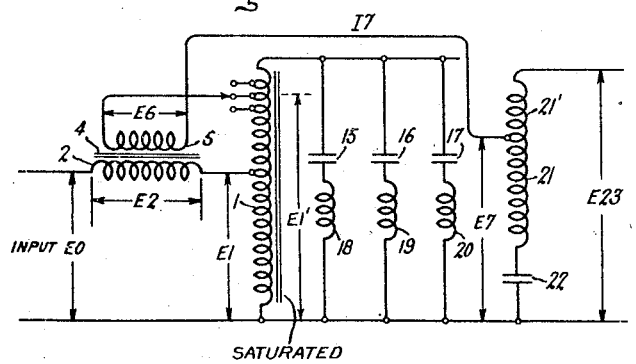
Inventor:
Thomas T. Short,
by Harry E. Dunham
His Attorney Patented May 25, 1948

2,442,214

UNITED STATES PATENT OFFICE 2,442,214

VOLTAGE STABILIZER

Thomas T. Short, Fort Wayne, Ind., assignor to General Electric Company, a corporation of New York Application July 14, 1944, Serial No. 544,964

19 Claims. (Cl. 323—61)

This invention relates to voltage stabilizers and more particularly to improvements in static alternating-current voltage stabilizers.

This is a continuation-in-part of my abandoned application Serial No. 496,548, filed July 29, 1943, and assigned to the present assignee.

As many electrical load devices, notably those utilizing hot cathode electric discharge devices, require for best operation a more constant voltage than is provided by most commercial alternating-current supply circuits, there is a need for a simple, inexpensive and reliable voltage stabilizing regulator which can be interposed between a supply circuit whose voltage fluctuates above and below its nominal or rated value and a load requiring substantially constant voltage.

In accordance with the present invention there is provided a novel and simple static voltage stabilizer of this type which utilizes the regulating properties of combined reactance elements of opposite sign, at least one of which has a non-linear volt-ampere characteristic. This stabilizer is characterized by relatively high input power factor which not only makes for relatively low input kv.-a. but also for a minimum overall size.

An object of the invention is to provide a new and improved voltage stabilizer.

Another object of the invention is to provide a simple, inexpensive and accurate static voltage stabilizer.

A further object of the invention is to provide an automatic voltage stabilizer having relatively high input power factor and relatively low losses.

The invention will be better understood from the following description taken in connection with the accompanying drawing and its scope will be pointed out in the appended claims.

In the drawing Fig. 1 illustrates diagrammatically an embodiment of the invention, Fig. 2 shows a core punching suitable for use in one of the elements of the invention, Figs. 3 and 4 are vector diagrams for explaining the operation of the invention, Figs. 5, 6, 7 and 8 are modifications of Fig. 1, Fig. 9 shows the addition of a frequency compensator with the circuit of Fig. 5, Fig. 10 is a modification for suppressing harmonics in the output voltage, Fig. 11 shows another form of frequency compensator which is adapted for use with variable loads, Fig. 12 is a vector diagram for explaining the operation of Fig. 11, and Fig. 13 is a combination of Figs. 10 and 11 and provides a stabilizer which has a very good output wave form and whose output voltage is substantially independent of reasonable variations in input frequency over a relatively wide range of load magnitude.

Referring now to the drawing and more particularly to Fig. 1, there is shown therein an alternating-current input circuit having a voltage $E_0$ and a current $I_0$. Connected across this circuit in series are a pair of windings 1 and 2 which are wound on core members 3 and 4 respectively. These core members may either be entirely separate or they may be mechanically joined so as to form a unitary structure. The core 3 is so proportioned that it is worked above the knee of its saturation curve with the result that the volt-ampere characteristic of winding 1 is non-linear in that the current through it changes much more rapidly than the voltage $E_1$ across it.

A preferred structure for core 3 is shown in Fig. 2. This is a restricted section core construction and is generally similar to the construction to which Patent 1,859,115, granted May 17, 1932, on an application filed November 9, 1931, in the name of C. M. Summers and assigned to the assignee of the present application, is directed. Three windows 8 are shown in Fig. 2 and these are bridged at their left and right-hand ends by parts of the center leg of the core. During normal operation these bridging members or restricted sections are saturated while the remainder of the core is unsaturated. This saturation causes a certain amount of leakage flux indicated by the curved lines 9 and I have found that the length of the windows in the direction of the flux should not exceed ¼" in order to keep this leakage flux from expanding too far out from the center leg of the core and thus inducing too much eddy currents in the winding, which is not shown but which surrounds the center leg. For example, if a single window having a length equal to the combined lengths of the three windows 8 were used, then the leakage flux would expand farther out, as indicated by the dotted lines 10, and the resulting eddy currents in the winding would cause a substantially greater rise in temperature. The core consists of a plurality of E-shaped punchings which are all identical but alternate ones are faced in opposite directions so that the complete laminated core is a three-legged structure. The straight dashed lines in Fig. 2 indicate the orientation of a second E-shaped punch which is underneath the one shown in the illustration.

The core 4 is normally worked below the knee of its saturation curve and along a substantially linear portion of this curve so that the voltage $E_2$ across winding 2 is directly proportional to the current I0 which flows through it. This result is preferably obtained by providing the core 4 with an air gap.

A capacitor 5 is effectively connected in shunt circuit relation with the winding 1 and its capacitive reactance is made slightly less than the normal magnetizing reactance of winding 1 so that winding 1 and capacitor 5 normally have a resultant capacitive reactance in that the current in capacitor 5 is higher than the current in winding 1, they both, of course, having the same voltage E1. Their operation is therefore in the neighborhood of, but slightly below, parallel resonance so that they together have a relatively high resultant non-linear capacitive reactance.

An additional winding 6, which may be an extension of winding 2, is mounted on the core 4 and an output circuit 7 having a substantially constant voltage E7 is connected across the parallel combination of winding 1 and capacitor 5, in series with the winding 6 whose voltage is E6. The purpose of the winding 6 is to correct for small variations in voltage E1.

The operation of Fig. 1 is as follows: When a voltage is impressed across the input of the stabilizer winding 2 resonates with the parallel combination of winding 1 and capacitor 5. The voltage across winding 1 rises rapidly until its core becomes partially saturated and winding 1 and capacitor 5 are near parallel resonance. The voltage E1 thus established across winding 1 and capacitor 5 is stable and is subject only to small changes with varying input voltage and varying load. As this circuit is operating near resonance the only energy required from the input is that to supply the losses in the circuit and the load watts.

The voltage E1, being relatively stable, forms the basis of the regulated output voltage. However, in order to obtain a completely regulated output voltage a relatively small voltage E6 is inserted in series with E1. This voltage E6 varies widely in such a manner as to compensate for changes in E1. As shown, this compensating voltage E6 is obtained from winding 6 on core 4. The magnitude of E6 is directly proportional to the input current I0. The stabilizer operates at a relatively high input power factor and it therefore follows that the input current I0 is directly proportional to the load and inversely proportional to input voltage. Therefore, with increasing load E6 increases proportionally and exactly compensates for the decrease in the value of E1. Similarly, with decreasing input voltage, E6 increases in magnitude and changes in phase position so as to compensate for the accompanying decrease in E1.

The vector relations in Fig. 1 at full load unity power factor with varying input voltage are shown in Fig. 3. The locus of the output voltage E7 is substantially an arc of a circle about the point 0. The vertical vector E0 corresponds to the nominal or rated value of the input voltage and this equals the vector sum of E1 and E2. The input current I0 lags the voltage E2 by substantially 90 degrees as E2 represents the voltage drop in a reactor. E6 is in the same direction as E2 and the vector resultant of E1 and E6 is equal to E7 which is the output voltage under these conditions. The load current is shown as I7 which is in phase with E7 under the assumed unity power factor load conditions.

If now the input voltage falls to $E_1 0$ there is a change in both magnitude and phase of the other two sides of the voltage triangle comprising the voltages across windings 1 and 2, these now becoming $E_1 1$ and $E_1 2$. The decrease in voltage across winding 1 represented by the difference between E1 and $E_1 1$ causes an increase in input current, the new value being $I_1 0$, and the phase of this current is also shifted so as to increase the input power factor. The increased value of input current causes an increase in voltage across the winding 2 so that $E_1 2$ is greater than E2. Consequently, $E_1 6$ is greater than E6 and thus it compensates the output voltage almost exactly for the change in input voltage so that $E_1 7$ is substantially the same as E7, although the input voltage has dropped from E0 to $E_1 0$.

If now the input voltage, instead of decreasing, increases from E0 to E'0, the voltage across winding 1 and capacitor 5 increases from E1 to E'1 and this causes the winding 1 and the capacitor 5 to approach more nearly to resonance, thus reducing the input current to I'0 so that the voltage across the winding 2 falls to E'2. E'6 is proportional in magnitude to E'2 and has the same phase as E'2 and this voltage combined with E'1 gives E'7 which it will be seen is equal in magnitude to E7 and $E_1 7$.

The dashed line is the locus of E1 for variations in input voltage and it will be seen that E6 changes in magnitude and phase with variations in supply voltage so as to compensate E7 for the changes in E1 and thus make E7 constant.

The effect on the output voltage E7 of variations in load magnitude is shown in Fig. 4 in which the input voltage E0 is the average or normal value and the load is varied. Three conditions of load are represented, namely, full load, half load and no load, the load being a unity power factor load. At full load the vector relations are the same as for the medium voltage condition in Fig. 3. At half load the input current I0 is materially reduced, thus reducing E2 and E6. However, the input power factor remains comparatively high. The output voltage compensation in this case is accomplished largely by the change in magnitude in E6. The smallest and lowest power factor position of I0 represents the input current at no load. This phase position is an apparent one only and is not in quadrature relationship with E2 because of the presence of harmonics which represent a fairly high percentage of the open circuit exciting current.

In the actual stabilizer in which both the load and the input voltage can vary simultaneously Figs. 3 and 4 will be superposed on each other.

The input power factor of the stabilizer is not materially affected by changes in the power factor of the load and therefore the stabilizer provides effective automatic power factor correction because of the fact that the parallel combination of winding 1 and capacitor 5 in Fig. 1 supplies the reactance component of the load with a relatively small change in level of E1. However, the output voltage is affected by changes in load power factor, a lagging power factor resulting in a decrease in output voltage. The new output voltage level is, however, just as constant as before with changes in input voltage and load magnitude.

The winding 1 can conveniently be used to provide different values of output voltage level and also as an autotransformer to step-up the voltage of capacitor 5. For example, as shown in Fig. 5, the input and output circuits can be shifted to higher and lower taps on winding 1 so as to change the output voltage level. In this case the input and output circuits are always connected to the same tap at any one time. Furthermore, there is an extension on the winding 1 and the capacitor 5 is connected across the entire winding 1. In this way the required capacitive volt-amperes can be obtained with a less expensive high-voltage low-current capacitor.

It is not necessary to have the capacitor 5 connected directly or conductively in shunt circuit relation with the winding 1 and, if desired, it can be inductively coupled to winding 1 by an additional winding 11 on the core 3, as shown in Fig. 6. In this case windings 1 and 11 constitute a transformer and the capacitor 5 is effectively in shunt circuit relation with the magnetizing reactance of the transformer, that is to say, it is effectively in shunt circuit relation with the magnetizing reactance of the primary winding of the transformer which is the winding 1.

The input and output circuits can also be insulated from each other by providing the core 3 with another winding 12 which is inductively related to winding 1 and thus has a voltage which is proportional to the voltage of E1. This arrangement is shown in Fig. 7. Windings 6 and 12 are connected in series across the constant voltage output circuit 7.

Fig. 8 is a combination of Figs. 1 and 7 in that the input and output circuits are insulated from each other but the capacitor 5 is connected directly in shunt with the winding 1.

Changes in input frequency cause the stabilizer to change its output voltage in the same direction and by very nearly the same percentage. For example, a 1 per cent change in input frequency will cause approximately a 1½ per cent change in the output voltage, this being an increase in the output voltage if the frequency increases and a decrease in the output voltage if the frequency decreases.

In Fig. 9 a frequency compensator has been added to the stabilizer. This compensator consists of a reactor 13 and a capacitor 14 connected in series in the output circuit 7. Elements 13 and 14 are tuned for resonance at the minimum operating frequency of the input circuit so that under these conditions the compensator has substantially zero reactance. As the frequency increases the compensator becomes a net inductive reactance, the value of whose reactance increases with frequency. Thus, for any given load the increase in reactance of the compensator can be made to compensate for the increase in voltage with increases in frequency so as to hold the frequency compensated output voltage constant. However, such a frequency compensator in effect converts the stabilizer to a constant load stabilizer because the appreciable series reactance of the stabilizer at all but the minimum operating frequency will seriously impair the regulation of the stabilizer if the load varies.

In Fig. 9 the input and output circuits are connected to different points in winding 1, thus making it an autotransformer for transforming the voltage between these circuits. Taps for the output circuit make it possible to change E1', and thus the output voltage, without changing E1 and the flux density of core 3.

The harmonic content of the output voltage of the stabilizer can be reduced to any desired amount by the modification shown in Fig. 10 in which the capacitor 5 is replaced by a series of harmonic filters. The source of harmonics of the circuit is the saturating reactor consisting of the winding 1 and the core 3. The capacitor 5, which normally supplies the exciting current for this reactor, has been divided into several sections 15, 16 and 17 connected respectively in series with reactors 18, 19 and 20. Each series capacitor-reactor section is tuned to series resonance with the harmonic voltage to be suppressed, namely, the third, fifth, seventh, etc. Each section is therefore net capacitive at the fundamental frequency and the three sections are so proportioned that their combined net capacitive reactance is the equivalent of capacitor 5 at the fundamental frequency of the stabilizer so that the voltage stabilizing action is exactly the same as in the previous circuits.

The operation of Fig. 10 in suppressing harmonics is as follows. The harmonic currents, instead of being supplied by a capacitor as in the previous circuits in which 5 supplies the exciting current for the winding 1, now flow through paths having only resistance as the various series capacitor-reactor sections are tuned for the various harmonics so that there is a zero reactance and low reactance path for each harmonic. This shifts the phase of the harmonic exciting currents from 90 degrees leading to an in-phase position with respect to their respective harmonic voltages. The harmonic currents which do flow are thus very effective in suppressing the harmonic voltages across winding 1 because harmonic currents flowing at right angles to the harmonic voltages which produce them can only act to increase these harmonic voltages. Thus, the harmonic filter actually reduces the harmonic currents which flow in the winding 1. They also increase the fundamental current with the result that the RMS value of the exciting current of winding 1 is approximately the same as in the previous circuits in which there is but a single capacitor 5. However, the decreased harmonic currents cause winding 1 and core 3 to operate at a lower temperature rise with the harmonic filter in the circuit than when only a single capacitor 5 is used. The harmonic filter practically eliminates harmonic currents drawn from the input of the stabilizer.

In order to permit variations in load while at the same time providing frequency compensation a modified form of frequency compensator is shown in Fig. 11. This comprises a winding 21 and a capacitor 22 connected in series across the output voltage E7. The winding 21 has an extension 21' so that its voltage E21' is added to E7 in order to get the frequency compensated output voltage E23. Winding 21 and capacitor 22 are so proportioned that they have a net capacitive reactance. Therefore, they together supplement capacitor 5 and the rating of capacitor 5 can be reduced.

The operation of the frequency compensator shown in Fig. 11 is as follows. The voltages across winding 21 and capacitor 22 are substantially in phase opposition with each other, the voltage across capacitor 22 being greater than the voltage across winding 21 because of the fact that the circuit is net capacitive. Therefore, the voltage across winding 21 and hence across winding 21' is substantially in phase opposition with the voltage E7 so that the voltage E21' subtracts from voltage E7 to give the compensated output voltage E23. If now the frequency increases, the reactance of the winding 21 increases and the reactance of the capacitor 22 decreases so that the voltage across the winding 21 and hence across the winding 21' increases and the voltage across the capacitor 22 decreases. Therefore, the voltage E21' increases with increases in frequency and as this voltage almost directly subtracts from the voltage E7 it compensates for the increase in E7 due to an increase in frequency. Similarly, a decrease in frequency causes the voltage E21' to decrease so that the decrease in its bucking effect compensates for the decrease in the voltage E7 with a decrease in frequency.

The frequency compensator of Fig. 11 is designed so that its current is relatively high compared with the full load current of the circuit 7. Therefore, variations in load on the compensator between full load and no load produce relatively small changes in magnitude in the voltage E21' and merely shift it slightly in phase so that the output voltage E23 does not change substantially between no load and full load.

The above-mentioned action of the frequency compensator is illustrated in Fig. 12 in which both the no load and full load conditions are represented. As shown in the diagram, E7 is equal to E22 (no load) plus E21 (no load), the latter being opposite in phase to E22. E21' (no load) is in phase with E21 (no load) and subtracts from E7 to give E23 (no load). The current producing the voltages E22 (no load), E21 (no load) and E21' (no load) is the no load component of the filter current which is shown leading the voltage E7 by 90 degrees. If now the stabilizer acts to supply full load at unity power factor, this load current in flowing through 21' causes a change in current in the filter due to the coupling between winding sections 21 and 21'. This is represented in Fig. 12 by the full load component of filter current which is shown in phase with E7 and at right angles to the no load component of filter current because it is a power current and not a reactive current. The vector sum of these two currents is the filter current at full load and, as shown, this is only slightly larger than the no load component of filter current and it is slightly out of phase with the latter. This current leads the voltage E21 (full load) of the winding 21 by 90 degrees so that E21' (full load) is shifted slightly in phase relative to E21' (no load) but as it has also been increased slightly in magnitude due to the increase in the filter current the value of E23 (full load) is substantially the same as E23 (no load).

In Fig. 13, Figs. 10 and 11 have been combined so as to provide a compensator with an output voltage which is substantially sinusoidal and which is substantially independent of relatively wide variations in input voltage, input frequency and load magnitude. This circuit draws substantially no harmonic currents from its input circuit and provides reasonably good output voltage regulation with reasonable variations in output power factor.

It is to be noted that in Fig. 13 both the harmonic filter consisting of the elements 15, 16, 17, 18, 19 and 20 and the frequency compensator consisting of the elements 21 and 22 are net capacitive so that in addition to performing their respective filtering and compensating actions they also take the place of the capacitive part of the stabilizer and supply the exciting current for the winding 1.

The slight decrease in output voltage between no load and full load which the frequency compensator shown in Figs. 11 and 13 tends to produce can be neutralized by adjusting the stabilizer so that its open circuit voltage is less than its full load voltage. This is accomplished by decreasing the value of E1 and adjusting E5 accordingly.

While there have been shown and described particular embodiments of this invention, it will be obvious to those skilled in the art that various changes and modifications can be made therein without departing from the invention and therefore it is aimed in the appended claims to cover all such changes and modifications as fall within the true spirit and scope of the invention.

What I claim as new and desire to secure by Letters Patent of the United States is:

1. In combination, a pair of magnetic core members, separate windings on said core members, a variable voltage alternating-current input circuit across which a pair of said windings which are on different ones of said core members are serially connected, a substantially constant voltage relatively high power factor output circuit across which another pair of said windings which are on different ones of said core members are serially connected, one of said core members being normally saturated and the other being normally unsaturated, and a capacitor effectively connected in shunt circuit relation with the magnetizing reactance of the winding on the saturated core member which is in the series connection of windings across said input circuit, the effective reactance of said capacitor being normally less than said magnetizing reactance.

2. In combination, a pair of magnetic cores, a pair of windings on one of said cores and a single winding on the other of said cores, a variable voltage alternating-current input circuit across which two of said windings on different cores are serially connected, a substantially constant voltage relatively high power factor output circuit across which the remaining winding and said single winding are serially connected, and a capacitor effectively connected in shunt circuit relation with the magnetizing reactance of said single winding, said capacitor having an effective reactance which is normally less than the magnetizing reactance of said single winding.

3. A voltage regulator comprising, in combination, a pair of serially-connected windings for connection across a variable voltage input circuit, one of said windings having an iron core with a saturated restricted section, a third winding serially connected with said winding which has a core with a saturated section for connection across a constant voltage output circuit, said third winding being inductively coupled with the other of said pair of windings, and capacitive-reactance means effectively connected in parallel with said winding which has a core with a saturated section, said capacitive-reactance means and its effectively parallel-connected winding having intersecting volt-ampere characteristics and normally operating at voltage and current values which are below those which correspond to the intersection of their respective volt-ampere characteristics.

4. An alternating-current voltage regulator comprising, in combination, a circuit having an input end and an output end, a pair of windings on the same iron core connected in said circuit, a third winding connected across said circuit on the output side of one of said serially-connected windings and on the input side of the other of said serially-connected windings, said third winding having an iron core with a normally saturated restricted section, and capacitive-reactance means effectively connected in parallel with said third winding, the net reactance of said third winding and capacitive-reactance means being capacitive and having a current which varies inversely with the voltage across said third winding.

5. A voltage regulator comprising, in combination, a pair of serially-connected windings for connection across a variable voltage input circuit, one of said windings having an iron core with a saturated restricted section, a third winding serially connected with said winding which has a core with a saturated section for connection across a constant voltage output circuit, said third winding being inductively coupled with the other of said pair of windings, and capacitive-reactance means effectively connected in parallel with said winding which has a core with a saturated section, said capacitive-reactance means and its effectively parallel connected winding having intersecting volt-ampere characteristics at the fundamental frequency of the regulator and operating at voltage and current values which are below those which correspond to the intersection of their respective fundamental frequency volt-ampere characteristics, said capacitive-reactance means including a plurality of branches each comprising a capacitor and a serially-connected reactor, each of said branches being resonant at a different higher harmonic frequency of the voltage of said regulator.

6. An alternating-current voltage regulator comprising, in combination, a circuit having an input end and an output end, a pair of windings on the same iron core connected in said circuit, a third winding connected across said circuit on the output side of one of said serially-connected windings and on the input side of the other of said serially-connected windings, said third winding having an iron core with a normally saturated restricted section, and capacitive-reactance means effectively connected in parallel with said third winding, the net reactance of said third winding and capacitive-reactance means being capacitive at the fundamental frequency of the voltage of said regulator and having a current which varies inversely with the voltage across said third winding, said capacitive-reactance means consisting of a capacitor and a reactor connected in series and tuned to resonance at a higher harmonic frequency of the voltage of said regulator.

7. In combination, a static alternating-current voltage stabilizer having an output voltage which is substantially independent of input voltage variations and load magnitude variations and which is dependent on input frequency variations, and a frequency compensator interposed between said output voltage and the stabilizer load, said frequency compensator producing a voltage which varies with frequency oppositely to the voltage of said stabilizer, the voltage of said frequency compensator being substantially independent of variations in load current.

8. A frequency compensator for an alternating-current circuit whose voltage changes with its frequency comprising, in combination, a winding and a capacitor connected in series across said circuit, said capacitor having a higher reactance than said winding, and a load circuit connected across said alternating-current circuit through a part of said winding.

9. A frequency compensator for an alternating-current circuit whose voltage changes with changes in its frequency and in the same direction comprising, in combination, a capacitor, and a winding, part of said winding and said capacitor being connected in series across said circuit, said capacitor having a higher reactance than said part of said winding throughout the normal range of fundamental frequency changes of said circuit, and a load circuit connected across said alternating-current circuit through the remainder of said winding, the active component of load circuit current being small in comparison to the no-load reactive current taken by said capacitor and said part of said winding.

10. A voltage regulator comprising, in combination, a pair of serially-connected windings for connection across a variable voltage input circuit, one of said windings having an iron core with a saturated section, a third winding serially connected with said winding which has a core with a saturated section for connection across a constant voltage output circuit, said third winding being inductively coupled with the other of said pair of windings, capacitive-reactance means effectively connected in parallel with said winding which has a core with a saturated section, and a frequency compensator connected across said constant voltage output circuit, said frequency compensator having a net capacitive reactance and producing a series voltage in said output circuit which is substantially independent of load current variations.

11. A voltage regulator comprising, in combination, a pair of serially-connected windings for connection across a variable voltage input circuit, one of said windings having an iron core with a saturated section, a third winding serially connected with said winding which has a core with a saturated section for connection across a constant voltage output circuit, said third winding being inductively coupled with the other of said pair of windings, capacitive-reactance means effectively connected in parallel with said winding which has a core with a saturated section, said capacitive-reactance means and its effectively parallel-connected winding having intersecting volt-ampere characteristics and normally operating at voltage and current values which are below those which correspond to the intersection of their respective volt-ampere characteristics, and a frequency compensator comprising a capacitor and a reactor connected in series across said constant voltage output circuit, the reactance of said capacitor being greater than the reactance of said reactor, said reactor having an extended portion, said extended portion being serially connected in said output circuit.

12. A voltage regulator comprising, in combination, a pair of serially-connected windings for connection across a variable voltage alternating-current supply circuit, one of said windings having a normally saturated iron core, the other winding having an unsaturated iron core, a capacitor effectively connected in shunt circuit relation with the winding having the saturated iron core, said capacitor and its effectively shunt-connected winding having a net capacitive-reactance in the neighborhood of resonance, a constant voltage output circuit connected to have its major component of voltage supplied by the winding with a saturated core, and a third winding linking said unsaturated iron core and connected in said output circuit, said capacitive-reactance including a reactor and a capacitor connected in series across said constant voltage output circuit, the reactance of said capacitor being greater than the reactance of said reactor at the fundamental frequency of the voltage of said output circuit, said reactor having an extended winding, the extension of said winding being serially connected in said output circuit on the lower side of the main portion of said reactor, the leading reactive current taken by said capacitor and reactor being high compared to the full load in-phase component of the current in said output circuit.

13. An alternating-current voltage regulator comprising, in combination, a circuit having an input end and an output end, a pair of windings on the same iron core connected in said circuit, a third winding connected across said circuit on the output side of one of said serially-connected windings and on the input side of the other of said serially-connected windings, said third winding having an iron core with a normally saturated section, capacitive-reactance means effectively connected in parallel with said third winding, the net reactance of said third winding and capacitive-reactance means being capacitive and having a current which varies inversely with the voltage across said third winding, and frequency compensating means connected to the output end of said circuit, said frequency compensating means drawing a no-load current from said circuit which is large in comparison with the in-phase component of the load current of said circuit, said frequency compensator having a winding section connected in said output circuit which produces a voltage which varies in frequency and which is substantially independent of variations in in-phase component of the load current of said circuit.

14. In a static automatic alternating-current voltage stabilizer, a winding having a saturated magnetic core, and capacitive means connected to supply the exciting current of said winding, said winding and capacitive means together constituting a non-linear effectively capacitive reactance whose net current at the fundamental frequency varies inversely with normal variations in fundamental frequency voltage across said winding, said capacitive means comprising a plurality of branches each comprising a reactor and a serially-connected capacitor, at least one branch being tuned to resonate at a higher harmonic frequency so as to act as a harmonic filter, at least one other of said branches being proportioned to have a substantially higher fundamental frequency reactive current than the active component of the full load current of said stabilizer, said last-mentioned branch acting as a frequency compensator for said stabilizer.

15. In combination, a static automatic alternating-current voltage stabilizer having an output whose voltage is lower at no load than at full load, and a frequency compensator connected between the output of said stabilizer and its load, said frequency compensator producing a drop in voltage from no load to full load which cancels the inverse voltage change of said stabilizer from no load to full load so that the frequency compensated load voltage is substantially independent of load variations.

16. A static alternating-current voltage regulator comprising, in combination, two transformers whose primary windings are connected in series between two input terminals which are for connection across a variable voltage alternating-current supply circuit, one of said transformers having an unsaturated core and the other one having a core with a saturated section, capacitive means connected across the secondary winding of the transformer whose core has the saturated section, the secondary winding of the transformer having the unsaturated core and the primary winding of the transformer having the core with the saturated section being connected in series between a pair of constant voltage output terminals, and means for varying the number of turns in common to both the input and output circuits of the primary winding of the transformer having the core with the saturated section for adjusting the voltage level between said output terminals.

17. A static alternating-current voltage regulator comprising, in combination, a voltage step-up autotransformer and a voltage step-down transformer, the primary windings of said transformers being connected in series between two input terminals which are for connection across a variable voltage alternating current supply circuit, said voltage step-down transformer having an unsaturated core and said voltage step-up autotransformer having a core with a saturated restricted section, capacitive means connected across the secondary winding of the voltage step-up autotransformer, the primary winding of the voltage step-up autotransformer and the secondary winding of the voltage step-down transformer being connected in series between a pair of constant voltage output terminals, and means for varying the number of turns in common to both the input and output circuits of the primary winding of said voltage step-up autotransformer for varying the voltage level between said output terminals.

18. A static voltage stabilizer having input and output terminals, a saturated core inductive element and an unsaturated core inductive element interconnected between said terminals, a capacitor connected with one of said elements, means for substantially preventing higher harmonics created by the saturated core element from appearing across said terminals, and means for compensating said stabilizer for frequency variations.

19. A static voltage stabilizer having input and output terminals, a saturated core inductive element, and capacitive means interconnected with said inductive element between said terminals, said capacitive means including both a harmonic filter and a frequency compensator for said stabilizer.

THOMAS T. SHORT.

REFERENCES CITED

The following references are of record in the file of this patent:

UNITED STATES PATENTS

| Number | Name | Date |
|---|---|---|
| 1,859,115 | Summers | May 17, 1932 |
| 1,967,108 | Werner | July 17, 1934 |
| 2,297,674 | Stevens | Sept. 29, 1942 |
| 2,179,353 | Schmutz | Nov. 7, 1939 |
| 2,068,316 | Farkas | Jan. 19, 1937 |

OTHER REFERENCES

"A Static Constant Current Circuit," AIEE Technical Paper 38-91, June 1938. (Copy available in Div. 26.)